United States Patent
Hoy et al.

(10) Patent No.: US 10,169,032 B2
(45) Date of Patent: Jan. 1, 2019

(54) PARALLEL DEVELOPMENT OF DIVERGED SOURCE STREAMS

(71) Applicant: International Business Machines Corporation, Armonk, NY (US)

(72) Inventors: Jeffrey R. Hoy, Southern Pines, NC (US); Barry J. Pellas, Durham, NC (US); David M. Stecher, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/515,633

(22) Filed: Oct. 16, 2014

(65) Prior Publication Data

US 2016/0110187 A1   Apr. 21, 2016

(51) Int. Cl.
  *G06F 9/44*  (2018.01)
  *G06F 17/30*  (2006.01)
  *G06F 8/71*  (2018.01)
  *G06F 8/73*  (2018.01)

(52) U.S. Cl.
  CPC . *G06F 8/71* (2013.01); *G06F 8/73* (2013.01)

(58) Field of Classification Search
  CPC .......................................... G06F 8/71
  See application file for complete search history.

(56) References Cited

U.S. PATENT DOCUMENTS

| | | | | |
|---|---|---|---|---|
| 6,275,223 B1 * | 8/2001 | Hughes | ................. | G06F 3/0483 715/751 |
| 6,698,013 B1 * | 2/2004 | Bertero | ..................... | G06F 8/71 717/101 |
| 6,757,893 B1 * | 6/2004 | Haikin | ..................... | G06F 8/71 717/170 |
| 6,766,334 B1 * | 7/2004 | Kaler | ........................ | G06F 8/71 |
| 7,290,251 B2 | 10/2007 | Livshits | | |
| 7,844,949 B2 | 11/2010 | Clemm et al. | | |
| 2004/0177343 A1 * | 9/2004 | McVoy | ..................... | G06F 8/71 717/122 |
| 2005/0262485 A1 | 11/2005 | Plante | | |
| 2006/0225040 A1 * | 10/2006 | Waddington | ............. | G06F 8/71 717/122 |
| 2007/0271617 A1 * | 11/2007 | Mitomo | ............. | G06F 9/44589 726/25 |
| 2009/0210852 A1 * | 8/2009 | Martineau | ................. | G06F 8/71 717/101 |

(Continued)

OTHER PUBLICATIONS

Office Action for U.S. Appl. No. 14/726,249, dated Apr. 4, 2016, 24 pages.

(Continued)

*Primary Examiner* — Li B Zhen
*Assistant Examiner* — Mohammad Kabir
(74) *Attorney, Agent, or Firm* — Jordan IP Law, LLC.

(57) ABSTRACT

Methods and systems may provide for tracking, on a position-by-position basis in a diverged code history associated with a diverged source stream, an origin source stream and an original position of code contained within the diverged source stream. Additionally, a modification may be detected with respect to a first portion of the code contained within the diverged source stream at a first position. In such a case, the modification and the first position may be automatically documented in the diverged code history.

10 Claims, 4 Drawing Sheets

(56) References Cited

U.S. PATENT DOCUMENTS

| | | | |
|---|---|---|---|
| 2009/0271768 A1 | 10/2009 | Goodson | |
| 2009/0300580 A1* | 12/2009 | Heyhoe | G06F 8/71 |
| | | | 717/106 |
| 2010/0017788 A1* | 1/2010 | Bronkhorst | G06F 11/3664 |
| | | | 717/125 |
| 2011/0214106 A1* | 9/2011 | Qi | G06F 11/3409 |
| | | | 717/124 |
| 2012/0054550 A1* | 3/2012 | Albrecht | G06F 11/362 |
| | | | 714/38.1 |
| 2014/0200928 A1* | 7/2014 | Watanabe | G06Q 40/08 |
| | | | 705/4 |
| 2015/0121051 A1* | 4/2015 | Bottleson | G06F 9/30065 |
| | | | 712/241 |

OTHER PUBLICATIONS

Final Office Action for U.S. Appl. No. 14/726,249, dated Sep. 9, 2016, 34 pages.
Advisory Action for U.S. Appl. No. 14/726,249, dated Nov. 30, 2016, 8 pages.
Office Action for U.S. Appl. No. 14/726,249, dated May 2, 2017, 36 pages.
Final Office Action for U.S. Appl. No. 14/726,249, dated Sep. 11, 2017, 43 pages.

* cited by examiner

PARALLEL DEVELOPMENT OF DIVERGED SOURCE STREAMS

BACKGROUND

Embodiments of the present invention generally relate to diverged source streams. More particularly, embodiments relate to the parallel development of diverged source streams.

Open source development may involve a team of computer programmers (e.g., from a particular organization) modifying code (e.g., a "diverged source stream") originating from open source code that is modified by different programmers in parallel with the diverged source stream, and periodically merging some or all of the changes from the two source streams together. Conventional merge tools may be unable, however, to handle more complex merge operations such as, for example, merges occurring in a different order than the underlying changes, merges of shifted code, merges in which both source streams contain new, diverged content in a specific section, and so forth.

BRIEF SUMMARY

Embodiments may include a computer program product to manage parallel development of diverged source streams, the computer program product comprising a computer readable storage medium having program instructions embodied therewith, the program instructions executable by a computer to cause the computer to track, on a position-by-position basis in a diverged code history associated with a diverged source stream, an origin source stream and an original position of code contained within the diverged source stream, detect a modification to a first portion of the code contained within the diverged source stream at a first position, automatically document the modification and the first position in the diverged code history, detect a move of a second portion of the code in the diverged source stream from a second position to a third position, automatically document the move and the second position in the diverged code history, detect an addition of a third portion of the code in the diverged source stream at a fourth position, automatically document the addition in the diverged code history, and track, on a position-by-position basis in an origin source history associated with the origin source stream, the origin source stream, an original position, the diverged source stream and a diverged position of code contained within the origin source stream.

Embodiments may also include a method of managing parallel development of diverged source streams, comprising tracking, on a position-by-position basis in a diverged code history associated with a diverged source stream, an origin source stream and an original position of code contained within the diverged source stream, detecting a modification to a first portion of the code contained within the diverged source stream at a first position, and automatically documenting the modification and the first position in the diverged code history.

Embodiments may also include a computer program product to manage parallel development of diverged source streams, the computer program product comprising a computer readable storage medium having program instructions embodied therewith, the program instructions executable by a computer to cause the computer to track, on a position-by-position basis in a diverged code history associated with a diverged source stream, an origin source stream and an original position of code contained within the diverged source stream, detect a modification to a first portion of the code contained within the diverged source stream at a first position, and automatically document the modification and the first position in the diverged code history.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
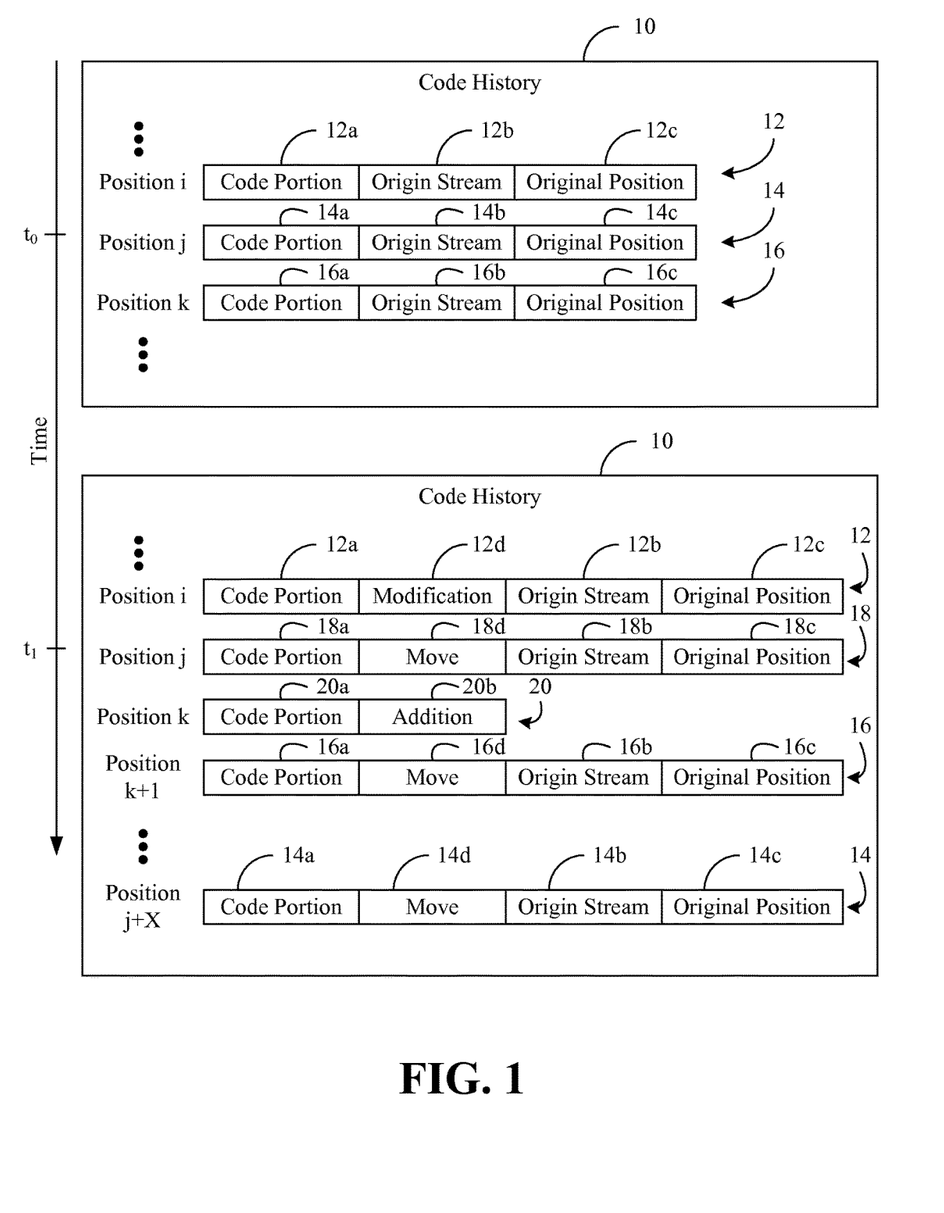
FIG. 1 is an illustration of an example of a code history according to an embodiment.

Turning now to FIG. 1, a code history 10 is shown for a diverged source stream containing source code originating from an origin source stream. The origin source stream may be, for example, a starting piece of open source code being developed by a first set and/or group of programmers (e.g., one or more open source and/or Group "A" developers), whereas the diverged source stream may be, for example, a version of the starting piece of open source code that changes in parallel with the starting piece of open source code as another set and/or group of programmers (e.g., Group "B") independently develop the diverged source stream. The code history 10 may generally be automatically generated and maintained by a parallel development tool. More particularly, the code history 10 may use indicators to track, on a position-by-position basis, the origin source stream and original position of the code contained within the diverged source stream (as well as subsequent positions in the diverged source stream over time).

For example, at time $t_0$, a first entry 12 (12a-12c) documents that a code portion 12a is located at "Position i" and was ported from a specific original position in a specific origin source stream by virtue of an original position indicator 12c and an origin stream indicator 12b, respectively. The first entry 12 may be a textual annotation that is added to the diverged source stream itself, a separate file and/or database, and that documents the changes to the diverged source stream on a position-by-position basis.

Thus, the origin stream indicator 12b might be the text "A1" to document that the code portion originated in version one of stream "A", the original position indicator 12c may be "-i" to document that the code portion was originally located at position "i" of the origin source stream, and so forth. In such a case, the part of the entry 12 after the code portion 12a might simply be "A1-i". Similarly, a second entry 14 (14a-14c) may document that a code portion 14a is located at "Position j" and was ported from an original position in an origin source stream by virtue of an original position indicator 14c and an origin stream indicator 14b (e.g., "A1-j"), and a third entry 16 (16a-16c) may document that a code portion 16a is located at "Position k" and was ported from an original position in an origin source stream by virtue of an original position indicator 16c and an origin stream indicator 16b (e.g., "A1-k"). The position-by-position basis may be a line-by-line basis, a line subset-by-line subset basis (e.g., argument/operand order), etc., or any combination thereof.

As developers (e.g., Group B computer programmers) change the diverged source stream over time, the illustrated code history 10 is automatically updated to reflect the changes on a position-by-position basis. For example, at time $t_1$, a manual modification of the code portion 12a might trigger a modification indicator 12d to be automatically pre-pended to the origin stream indicator 12b and the original position indicator 12c in the code history 10 to obtain an updated first entry 12. The modification indicator 12d might include, for example, text such as "B2" to indicate that the modification took place in the transition to version two of the diverged source stream "B". Thus, the new entry 12 at time $t_1$ may contain "B2, A1-j".

Similarly, if a Group B developer moves another code portion 18a to the Position j, a fourth entry 18 (18a-18d) may be automatically revised to document the move. For example, the automatic revision may include pre-pending a move indicator 18d to an origin stream indicator 18b and an original position indicator 18c of the fourth entry 18 in the code history 10. The move indicator 18d may include, for example, a documentation of the previous position (e.g., "x"), source stream (e.g., "B") and version level (e.g., "1", resulting in "B1-x"), as well as an indication of the source stream and version level at which the move took place (e.g., B2). The part of the fourth entry 18 after the code portion 18*a* might therefore be "B2, B1-x, A1-x". In the illustrated example, the code previously located at Position j is shifted to Position j+X, which causes the second entry 14 to be automatically updated with a move indicator 14*d* to document the move/shift.

Additionally, the addition of a new code portion 20*a* at Position k of the diverged source stream may cause the generation of a fifth entry 20 (20*a*, 20*b*) in the code history 10, wherein the fifth entry 20 may include an addition indicator 20*b*. The addition indicator 20*b* may document, for example, the source stream and version level at which the addition took place (e.g., "B2"). In the illustrated example, the code previously located at Position k is shifted to Position k+1, which causes the third entry 16 to be automatically updated with a move indicator 16*d* to document the move/shift.

Figure 2:
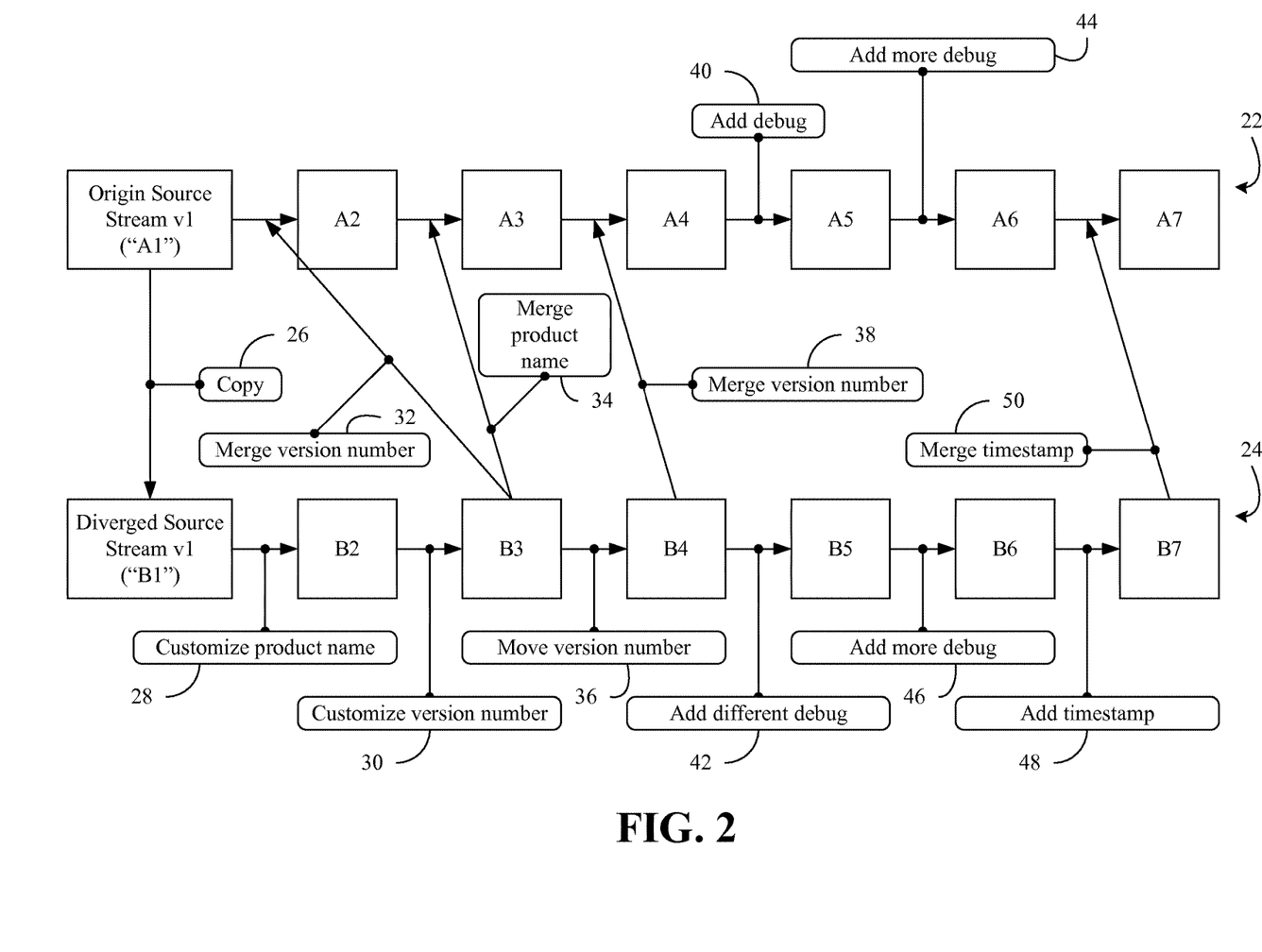
FIG. 2 is a block diagram of an example of a plurality of diverged source streams according to an embodiment.

Turning now to FIG. 2, a plurality of diverged streams is shown. In the illustrated example, a first stream 22 represents, for example, an origin source stream (e.g., starting piece of open source code being developed by open source and/or Group A programmers) and a second stream 24 represents, for example, a diverged source stream (e.g., version of the starting piece of open source code that changes in parallel as Group B programmers make revisions). Accordingly, a copy event 26 may result in the creation of a first version B1 of the diverged source stream based on a first version A1 of the origin source stream. Thus, the first versions A1, B1 might contain code such as the example code shown in Tables I and II below.

TABLE I

Origin Source Stream
A1

```
public static void printProductName( ) { // A1
    System.out.println("Organization A Acme Project"); // A1
    System.out.println("Part of Organization A Gizmo"); // A1
    System.out.println("Version 1.0"); // A1
} // A1
public static int addNumbers(int a, int b) { // A1
    return a+b; // A1
} // A1
```

TABLE II

Diverged Source Stream
B1

```
public static void printProductName( ) { // A1-1
    System.out.println("Organization A Acme Project"); // A1-2
    System.out.println("Part of Organization A Gizmo"); // A1-3
    System.out.println("Version 1.0"); // A1-4
} // A1-5
public static int addNumbers(int a, int b) { // A1-6
    return a+b; // A1-7
} // A1-8
```

A manual modification such as, for example, a customization event 28 might involve a change to a product name mentioned in the code of the second stream 24. The modification may be detected and automatically documented in the diverged code history associated with a second version B2 of the second stream 24 as shown in Table III below.

TABLE III

Diverged Source Stream
B2

```
public static void printProductName( ) { // A1-1
    System.out.println("Organization B Code Project"); // B2, A1-2
    System.out.println("An Acme Experience"); // B2, A1-3
    System.out.println("Version 1.0"); // A1-4
} // A1-5
public static int addNumbers(int a, int b) { // A1-6
    return a+b; // A1-7
} // A1-8
```

Another manual modification such as, for example, a customization event 30 may involve a change to the version number mentioned in the code of the second stream. The modification may be detected and automatically documented in the diverged code history associated with a third version B3 the second stream 24 as shown in Table IV below.

TABLE IV

Diverged Source Stream
B3

```
public static void printProductName( ) { // A1-1
    System.out.println("Organization B Code Project"); // B2, A1-2
    System.out.println("An Acme Experience"); // B2, A1-3
    System.out.println("Version 1.1"); // B3, A1-4
} // A1-5
public static int addNumbers(int a, int b) { // A1-6
    return a+b; // A1-7
} // A1-8
```

In the illustrated example, a merge event 32 involves merging (e.g., in response to a merge request from a programmer) only the customized version number from the third version B3 of the second stream 24 with the first version A1 of the first stream 22, wherein the merge event 32 causes an origin code history associated with the first stream 22 to be automatically updated. The Group B programmer may be given the option of ignoring the earlier customization event 28 with respect to the product name. As a result, a second version A2 of the first stream 22 may be created as illustrated below in Table V.

TABLE V

Origin Source Stream
A2

```
public static void printProductName( ) { // A1
    System.out.println("Organization A Acme Project"); // A1
    System.out.println("Part of Organization A Gizmo"); // A1
    System.out.println("Version 1.1"); // A2, B3-4
} // A1
public static int addNumbers(int a, int b) { // A1
    return a+b; // A1
} // A1
```

Another merge event 34 may involve merging the customized product name from the third version B3 of the second stream 24 with the second version A2 of the first stream 22. The merge event 34 may cause the origin code history associated with the first stream 22 to be automatically updated. Of particular note is that the customized product name may be considered out-of-order code to the extent that was modified prior to the customized version number, which was already merged via merge event 32. As will be discussed in greater detail, the parallel development tool may search the origin code history for content (e.g., "A1-3") corresponding to the out-of-order code in the diverged code history to resolve the merge request. As a result, a third version A3 of the first stream 22 may be created as illustrated below in Table VI.

TABLE VI

Origin Source Stream
A3

```
public static void printProductName( ) { // A1
    System.out.println("Organization A Acme Project"); // A1
    System.out.println("An Acme Experience"); // A3, B2-3, A1-3
    System.out.println("Version 1.1"); // A2, B3-4
} // A1
public static int addNumbers(int a, int b) { // A1
    return a+b; // A1
} // A1
```

In yet another example, a move event 36 might involve moving/shifting a portion (e.g., the version number) of the code in the second stream 24 from one position to another and changing it. In such a case, the moved version number may be considered shifted code to the extent that it has changed positions from the original position in the first stream 22. The move and the previous position may be automatically documented in the code history associated with the third version B3 of the second stream 24 to produce a fourth version B4 of the second stream 24, as illustrated below in Table VII.

TABLE VII

Diverged Source Stream
B4

```
public static void printProductName( ) { // A1-1
    System.out.println("Version 1.2"); // B4, B3-4, A1-4
    System.out.println("Organization B Code Project"); // B4, B3-2, A1-2
    System.out.println("An Acme Experience"); // B4, B3-3, A1-3
} // A1-5
public static int addNumbers(int a, int b) { // A1-6
    return a+b; // A1-7
} // A1-8
```

In the illustrated example, another merge event 38 involves merging the relocated version number from the fourth version B4 of the second stream 24 with the third version A3 of the first stream 22. The merge event 38 may cause the origin code history associated with the first stream to be automatically updated to produce a fourth version A4 of the first stream 22, as demonstrated below in Table VIII.

TABLE VIII

Origin Source Stream
A4

```
public static void printProductName( ) { // A1
    System.out.println("Organization A Acme Project"); // A1
    System.out.println("An Acme Experience"); // A3, B2-3, A1-3
    System.out.println("Version 1.2"); // A4, B4-2, B3-4, A1-4
} // A1
public static int addNumbers(int a, int b) { // A1
    return a+b; // A1
} // A1
```

Additionally, a Group A programmer might trigger an addition event 40 by adding, for example, debug code to the first stream 22. The addition event 40 may be detected and automatically documented in the origin code history associated with a fifth version A5 of the first stream 22 as shown in Table IX below.

TABLE IX

Origin Source Stream
A5

```
public static void printProductName( ) { // A1
    System.out.println("Organization A Acme Project"); // A1
    System.out.println("An Acme Experience"); // A3, B2-3, A1-3
    System.out.println("Version 1.2"); // A4, B4-2, B3-4, A1-4
} // A1
public static int addNumbers(int a, int b) { // A1
    System.out.println("entering addNumbers"); // A5
    return a+b; // A1
} // A1
```

Moreover, the addition event 40 may take place in parallel with another addition event 42 involving the addition of, for example, different debug code to the second stream 24. The addition event 42 may also be detected and automatically documented in the diverged code history associated with a fifth version B5 the second stream 24 as shown in Table X below.

TABLE X

Diverged Source Stream
B5

```
public static void printProductName( ) { // A1-1
    System.out.println("Version 1.2"); // B4, B3-4, A1-4
    System.out.println("Organization B Code Project"); // B4, B3-2, A1-2
    System.out.println("An Acme Experience"); // B4, B3-3, A1-3
} // A1-5
public static int addNumbers(int a, int b) { A1-6
    String methodName = "addNumbers"; // B5
    _log.entering(CLASS, addNumbers); // B5
    return a+b; // A1-7
} // A1-8
```

In the illustrated example, more addition events 44, 46 are initiated by the programmers for the respective streams 22, 24. Tables XI and XII below demonstrate that the addition events 44, 46, may be detected and automatically documented in the code histories associated with a sixth version A6 of the first stream 22 and a sixth version B6 of the second stream 24, respectively.

TABLE XI

Origin Source Stream
A6

```
public static void printProductName( ) { // A1
    System.out.println("Organization A Acme Project"); // A1
    System.out.println("An Acme Experience"); // A3, B2-3, A1-3
    System.out.println("Version 1.2"); // A4, B4-2, B3-4, A1-4
} // A1
public static int addNumbers(int a, int b) { // A1
    System.out.println("entering addNumbers"); // A5
    System.out.println("input values: "+a+", "+b); // A6
    return a+b; // A1
} // A1
```

TABLE XII

Diverged Source Stream
B6

```
public static void printProductName( ) { // A1-1
    System.out.println("Version 1.2"); // B4, B3-4, A1-4
    System.out.println("Organization B Code Project"); // B4, B3-2, A1-2
    System.out.println("An Acme Experience"); // B4, B3-3, A1-3
} // A1-5
```

TABLE XII-continued

Diverged Source Stream
B6

```
public static int addNumbers(int a, int b) { // A1-6
    String methodName = "addNumbers"; // B5
    _log.entering(CLASS, addNumbers); // B5
    _log.logp(Level.FINEST, CLASS, methodName, "var a="+a) // B6
    _log.logp(Level.FINEST, CLASS, methodName, "var b="+b) // B6
    return a+b; // A1-7
} // A1-8
```

In addition, another addition event 48 may result from a Group B programmer adding code such as, for example, a timestamp, to the second stream 24. The addition event 48 may be detected and automatically documented in the diverged code history associated with a seventh version B7 of the second stream 24 as shown in Table XIII below.

TABLE XIII

Diverged Source Stream
B7

```
public static void printProductName( ) { // A1-1
    System.out.println("Version 1.2"); // B4, B3-4, A1-4
    System.out.println("Organization B Code Project"); // B4, B3-2, A1-2
    System.out.println("An Acme Experience"); // B4, B3-3, A1-3
} // A1-5
public static int addNumbers(int a, int b) { // A1-6
    String methodName = "addNumbers"; // B5
    _log.entering(CLASS, addNumbers); // B5
    stamp(System.currentTimeMillis( )); // B7
    _log.logp(Level.FINEST, CLASS, methodName, "var a="+a) // B6
    _log.logp(Level.FINEST, CLASS, methodName, "var b="+b) // B6
    return a+b; // A1-7
} // A1-8
```

The additional timestamp code may be considered conflicted code to the extent that it is bounded by modified code (e.g., the debug code that resulted in the fifth version B5 and the debug code that resulted in the sixth version B6). In the illustrated example, a merge event 50 may involve merging the conflicted code corresponding to the addition event 48. As will be discussed in greater detail, the parallel development tool may automatically correlate content corresponding to the modified code in the diverged code history with content in the origin code history to resolve the request.

For example, the parallel development tool may automatically determine that the " . . . int addNumbers . . . " line in the seventh version B7 (Table XIII) matches line six of the sixth version A6 (Table XII). Moreover, the parallel development tool may determine that the "return a+b" line in the seventh version B7 (Table XIII) matches line nine of the sixth version A6 (Table XII). In the seventh version B7, two lines were added in one changeset (B5) above the line being merged, and two lines were added in another changeset (B6) below the line to merge. The parallel development tool may also determine that, in the sixth version A6 (Table XII), two lines were added in two separate changesets (A5 and A6) within the conflicted area. Accordingly, the parallel development tool may propose an alignment of the two distinct changesets in both streams 22, 24, which may result in a correct merge of the new line as illustrated in Table XIV below.

TABLE XIV

Origin Source Stream
A7

```
public static void printProductName( ) { // A1
    System.out.println("Organization A Acme Project"); // A1
    System.out.println("An Acme Experience"); // A3, I2-3, A1-3
    System.out.println("Version 1.2"); // A4, I4-2, I3-4, A1-4
} // A1
public static int addNumbers(int a, int b) { // A1
    System.out.println("entering addNumbers"); // A5
    stamp(System.currentTimeMillis( )); // B7-9
    System.out.println("input values: "+a+", "+b); // A6
    return a+b; // A1
} // A1
```

Figure 3:
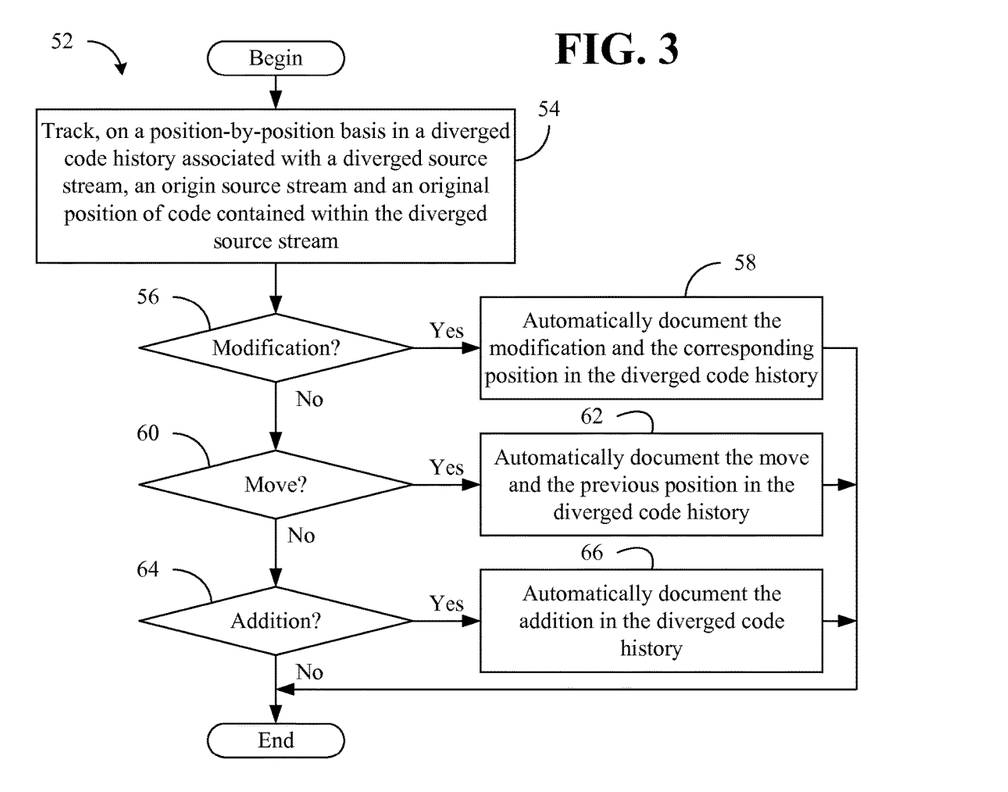
FIG. 3 is a flowchart of an example of a method of operating a parallel development tool according to an embodiment.

FIG. 3 shows a method 52 of operating a parallel development tool. Illustrated processing block 54 may provide for tracking, on a position-by-position basis in a diverged code history associated with a diverged source stream, an origin source stream and an original position of code contained within the diverged source stream. As already noted, the tracking may involve the use of a textual annotation that is added to the diverged source stream itself, a separate file and/or database, and that documents the changes to the diverged source stream on a position-by-position basis. A determination may be made at block 56 as to whether a modification to a portion of code contained within the diverged source stream at a particular position has been detected. If so, illustrated block 58 automatically documents the modification and the particular position in the diverged code history.

If no modification is detected at block 56, block 60 may determine whether a move of a portion of the code in the diverged source stream from one position to another position. If a move is detected, illustrated block 62 automatically documents the move and the previous position in the diverged code history. If no move is detected at block 60, block 64 may detect an addition of a portion of the code in the diverged source stream at a particular position. The addition may cause block 66 to automatically document the addition in the diverged code history.

Figure 4:
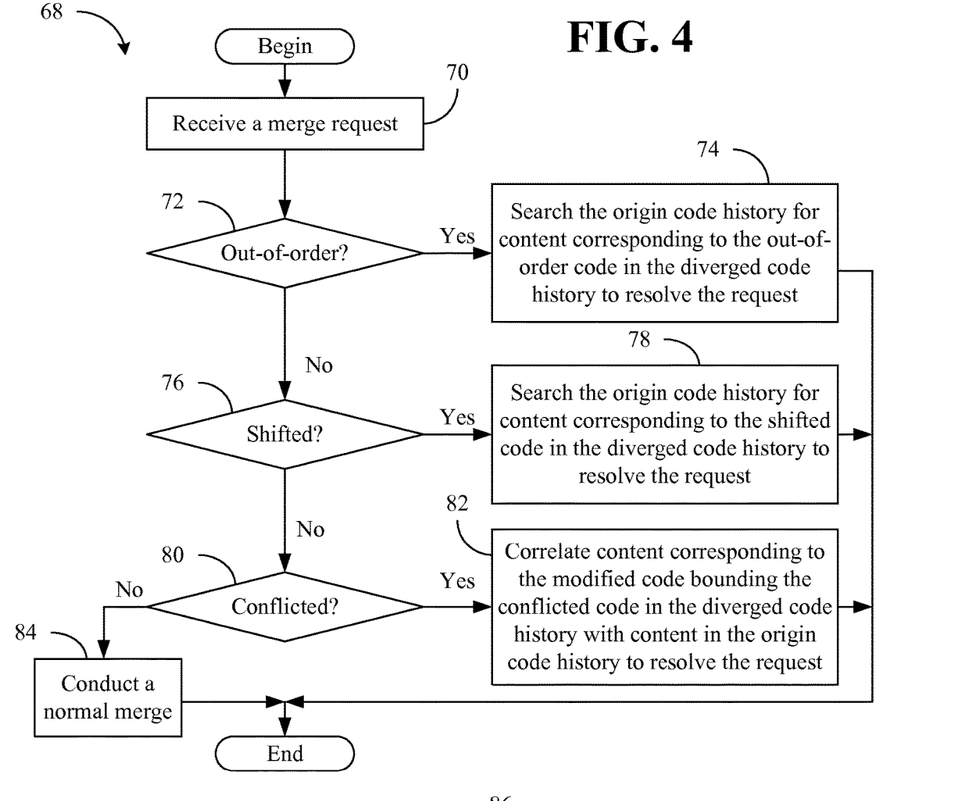
FIG. 4 is a flowchart of an example of a method of merging diverged source streams according to an embodiment.

Turning now to FIG. 4, a method 68 of merging diverged source streams is shown. Illustrated processing block 70 provides for receiving a merge request, wherein a determination may be made at block 72 as to whether the merge request involves out-of-order code that was modified prior to other code that has already been merged. If so, block 74 may search an origin code history associated with the origin source stream for content corresponding to the out-of-order code in a diverged code history in order to resolve the merge request. If out-of order code is not involved, block 76 may determine whether the merge request involves shifted code that has changed positions from the origin source stream. If so, the origin code history may be searched at block 78 for content corresponding to the shifted code in the diverged code history to resolve the request. Additionally, block 80 may determine whether the merge request involves conflicted code that is bounded by modified code. In such a case, illustrated block 82 correlates content corresponding to the modified code with content in the origin code history to resolve the request. If conflicted code is not detected at block 80, a normal merge may be conducted at block 84.

Figure 5:
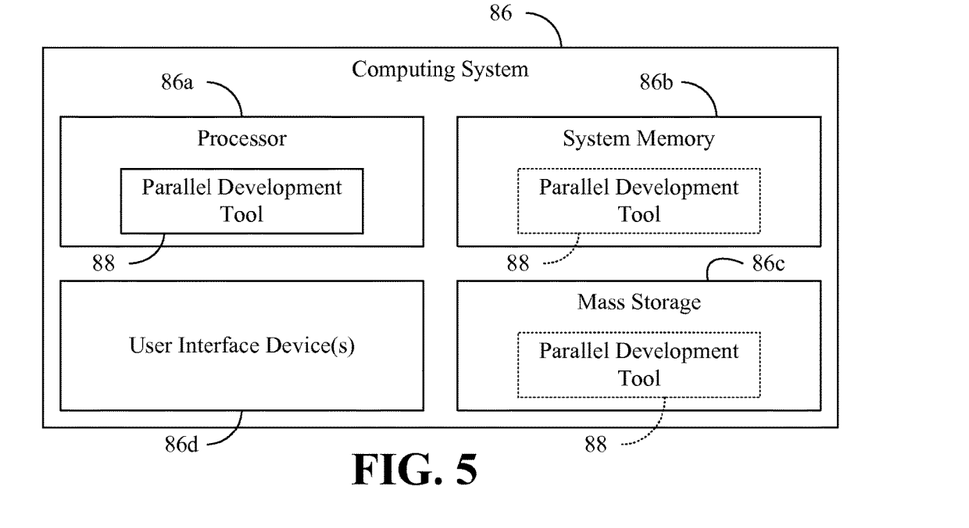
FIG. 5 is a block diagram of an example of a computing system according to an embodiment.

FIG. 5 shows a computing system 86 (86a-86d) that may be used to manage the parallel development of source code. In the illustrated example, a processor 86a operates a parallel development tool 88, which may optionally be obtained from system memory 86b and/or mass storage 86c of the computing system 86. The parallel development tool 88 may be configured to conduct one or more aspects of the method 52 (FIG. 3) and/or the method 68 (FIG. 4), already discussed. Therefore, the parallel development tool 88 may track, on a position-by-position basis in a diverged code history associated with a diverged source stream, an origin source stream and an original position of code contained within the diverged source stream. Additionally, the parallel development tool 88 may track, on a position-by-position basis in an origin code history associated with the origin source stream, the origin source stream and an original position of code contained within the origin source stream. Moreover, the parallel development tool 88 may track, on a position-by-position basis in the origin code history, the diverged source stream and a diverged position of the code contained within the origin source stream. In one example, the parallel development tool 88 is capable of merging out-of-order code, shifted code and/or conflicted code, as already discussed. The computing system 86 may also include one or more user interface devices 86d to present the results of the tracking and merges to one or more users of the computing system 86.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising a computer readable storage medium having program instructions embodied therewith, the program instructions, when executed by a computer, cause the computer to:

manage, using a parallel development tool implemented in programmable logic circuitry, diverged source streams, wherein the parallel development tool is to:

track, on a position-by-position basis in a diverged code history associated with a diverged source stream, an origin source stream and an original position of code contained within the diverged source stream, wherein the position-by-position basis is one or more of an argument order or an operand order, and wherein the diverged code history is to be a separate file;

detect a modification to a first portion of the code contained within the diverged source stream at a first position;

automatically document the modification and the first position in the diverged code history, wherein the modification triggers a modification indicator to be prepended to an origin stream indicator and an original position indicator in the diverged code history, and wherein the modification indicator indicates that the modification occurred in a transition to a version of the diverged source stream;

detect a move of a second portion of the code in the diverged source stream from a second position to a third position;

automatically document the move and the second position in the diverged code history, wherein the move triggers a move indicator to be prepended to the origin stream indicator and the original position indicator in the diverged code history, and wherein the move indicator indicates the diverged source stream and a version level at which the move occurred;

detect an addition of a third portion of the code in the diverged source stream at a fourth position;

automatically document the addition with a timestamp in the diverged code history;

present, through a user interface device, an option to ignore the detected modification;

receive a request to merge shifted code contained within the diverged source stream with the origin source stream;

search, using the modification indicator, the original position indicator, the origin stream indicator, the move indicator, and the timestamp, an origin code history for content corresponding to the shifted code in the diverged code history to resolve the request;

track, on a position-by-position basis in the origin code history associated with the origin source stream, the origin source stream, an original position, the diverged source stream and a diverged position of code contained within the origin source stream, using the modification indicator, the original position indicator, the origin stream indicator, the move indicator, and the timestamp;

receive a request to merge out-of-order code contained within the diverged source stream with the origin source stream, wherein the out-of-order code is to be modified prior to other code that has already been merged; and present, through the user interface device, an alignment option to merge conflicted code, wherein the conflicted code is to be bounded by modified code, wherein the alignment option identifies the modified code at one or more locations to use to correctly merge the conflicted code, and wherein at least one of the one or more locations of the conflicted code includes one or more of the modification, the move, the shifted code, the addition or the out-of-order code.

2. The computer program product of claim 1, wherein the program instructions when executed by the computer further cause the computer to:

search the origin code history for content corresponding to the out-of-order code in the diverged code history to resolve the request.

3. The computer program product of claim 1, wherein the shifted code has changed positions from the origin source stream.

4. The computer program product of claim 1, wherein the program instructions when executed by the computer further cause the computer to:
receive a request to merge the conflicted code contained within the diverged source stream with the origin source stream; and
correlate content corresponding to the modified code in the diverged code history with content in the origin code history to resolve the request, wherein the correlated content identifies the one or more locations of the modified code in the diverged code stream, wherein the modified code includes one or more different debug code portions and the timestamp, and wherein the timestamp is bounded by the modified code.

5. A computer program product comprising a computer readable storage medium having program instructions embodied therewith, the program instructions, when executed by a computer, cause the computer to:
manage, using a parallel development tool implemented in programmable logic circuitry, diverged source streams, wherein the parallel development tool is to:
track, on a position-by-position basis in a diverged code history associated with a diverged source stream, an origin source stream and an original position of code contained within the diverged source stream, wherein the position-by-position basis is one or more of an argument order or an operand order, and wherein the diverged code history is to be a separate file;
detect a modification to a first portion of the code contained within the diverged source stream at a first position;
present, through a user interface device, an option to ignore the detected modification;
receive a request to merge shifted code contained within the diverged source stream with the origin source stream, wherein the shifted code has changed positions from the origin source stream;
search an origin code history associated with the origin source stream for content corresponding to the shifted code in the diverged code history to resolve the request;
automatically document the modification and the first position in the diverged code history, wherein the modification triggers a modification indicator to be prepended to an origin stream indicator and an original position indicator in the diverged code history, and wherein the modification indicator indicates that the modification occurred in a transition to a version of the diverged source stream;
receive a request to merge out-of-order code contained within the diverged source stream with the origin source stream, wherein the out-of-order code is to be modified prior to other code that has already been merged;
present, through the user interface device, an alignment option to merge conflicted code, wherein the conflicted code is to be bounded by modified code, wherein the alignment option identifies the modified code at one or more locations to use to correctly merge the conflicted code, and wherein at least one of the one or more locations of the modified code includes the out-of-order code,
detect a move of a second portion of the code in the diverged source stream from a second position to a third position; and
automatically document the move and the second position in the diverged code history,
wherein the move triggers a move indicator to be prepended to the origin stream indicator and the original position indicator in the diverged code history, and
wherein the move indicator indicates the diverged source stream and a version level at which the move occurred.

6. The computer program product of claim 5, wherein the program instructions when executed by the computer further cause the computer to:
detect an addition of a third portion of the code in the diverged source stream at a fourth position; and
automatically document the addition with a timestamp in the diverged code history.

7. The computer program product of claim 6, wherein the program instructions when executed by the computer further cause the computer to track, on a position-by-position basis in the origin code history associated with the origin source stream, the origin source stream and an original position of code contained within the origin source stream, using the modification indicator, the original position indicator, the origin stream indicator, the move indicator, and the timestamp.

8. The computer program product of claim 7, wherein the program instructions when executed by the computer further cause the computer to track, on the position-by-position basis in the origin code history, the diverged source stream and a diverged position of the code contained within the origin source stream.

9. The computer program product of claim 5, wherein the program instructions when executed by the computer further cause the computer to:
search the origin code history associated with the origin source stream for content corresponding to the out-of-order code in the diverged code history to resolve the request.

10. The computer program product of claim 6, wherein the program instructions when executed by the computer further cause the computer to:
receive a request to merge the conflicted code contained within the diverged source stream with the origin source stream; and
correlate content corresponding to the modified code in the diverged code history with content in the origin code history associated with the origin source stream to resolve the request, wherein the correlated content identifies the one or more locations of the modified code in the diverged code stream, wherein the modified code includes one or more different debug code portions and the timestamp, and wherein the timestamp is bounded by the modified code.

* * * * *